United States Patent Office 3,378,538
Patented Apr. 16, 1968

3,378,538
PROCESS FOR PREPARING SULFUR MODIFIED POLYCHLOROPRENE
Anthony Archibald Sparks, Epsom Downs, England, assignor to The Distillers Company Limited, Edinburgh, Scotland, a British company
No Drawing. Filed Oct. 7, 1965, Ser. No. 493,886
Claims priority, application Great Britain, Oct. 24, 1964, 43,454/64
10 Claims. (Cl. 260—92.3)

ABSTRACT OF THE DISCLOSURE

Sulphur modified polychloroprene rubber having superior storage properties superior to known sulphur modified polychloroprene rubbers are obtained by polymerizing chloroprene monomer, 2-chloro-1,3-butadiene, either alone or with a minor proportion of a copolymerizable monomer in an aqueous emulsion system in the presence of sulphur and a dialkyl xanthogen disulphide of the formula:

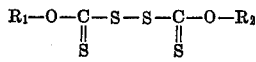

wherein $R_1$ and $R_2$ are alkyl of 1 to 8 carbon atoms, wherein the proportion of the dialkyl xanthogen disulphide in relation to the chloroprene monomer is insufficient to prevent the formation of "solid" polymer, i.e., a polymer having a Mooney viscosity ML 1+4' (100° C.) of at least 25 as determined by the method described in British standard specification No. 1,673, part 3, 1951, when the rubber is passed ten times through a mill with the rolls at a temperature of 20±5° C. and with a nip gap of eighty thousandths of an inch.

---

The present invention relates to a process for preparing sulphur modified polychloroprene and to the sulphur modified polychloroprene prepared by this process.

The process for preparing sulphur modified polychloroprene according to the present invention comprises polymerising chloroprene monomer (2-chloro-1,3-butadiene), alone or with a minor proportion of a copolymerisable monomer in an aqueous emulsion system in the presence of sulphur and a dialkyl xanthogen disulphide having the formula

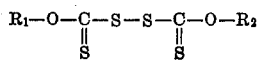

where $R_1$ and $R_2$ represent alkyl groups containing from 1 to 8 carbon atoms wherein the proportion of dialkyl xanthogen disulphide in relation to chloroprene monomer is insufficient to prevent the formation of "solid" polymer, as herein defined.

By solid polymer is meant a polymer having a Mooney viscosity ML 1+4' (100° C.) of at least 25 as determined by the method described in British standard specification No. 1,673, part 3, 1951 when the rubber is passed ten times through a mill with the rolls at a temperature of 20±5° C. and with a nip gap of eighty thousandths of an inch.

Suitable copolymerisable monomers contain at least one polymerisable group having the structure $CH_2=C<$, for example vinyl substituted aromatic compounds, e.g. styrene, vinyl toluenes, and vinyl naphthalenes; acrylic and methacrylic acid esters and nitriles, e.g. methyl acrylate and acrylonitrile, and conjugated aliphatic dienes, e.g. 1,3-butadiene, isoprene and 2,3-dichloro-1,3-butadiene. It is preferred to use less than 10% by weight of the copolymerisable monomer in relation to the weight of chloroprene monomer initially present.

The sulphur is preferably dissolved in the monomer and all of it can be present at the start of polymerisation but incremental addition during polymerisation is also possible. The preferred proportion by weight of sulphur to the total weight of chloroprene monomer charged to the polymerisation is in the range 0.01 to 2.0%.

Examples of suitable dialkyl xanthogen disulphides are the dialkyl, di-isoalkyl and bis-2 ethyl hexyl xanthogen disulphides.

The preferred dialkyl xanthogen disulphides are those in which $R_1$ and $R_2$ are alkyl groups containing three or four carbon atoms such as for example di-isopropyl xanthogen disulphide.

The proportion of dialkyl xanthogen disulphide in relation to chloroprene monomer charged to the polymerisation depends upon the viscosity required in the product and on the percentage of monomer converted to polymer when the polymerisation is short stopped.

Suitably the proportion by weight of dialkyl xanthogen disulphide in relation to the total weight of chloroprene monomer charged to the polymerisation is in the range 0.01 to 1.5%.

All the dialkyl xanthogen disulphide can be present at the start of polymerisation or part can be added at the start and the remainder added incrementally during polymerisation. The proportion of dialkyl xanthogen disulphide required to produce a product of given plasticity is greater when the dialkyl xanthogen disulphide is added incrementally during the polymerisation than when it is all added at the start. The incremental additions are preferably made by dissolving the xanthogen disulphide in chloroprene monomer and adding this solution incrementally during polymerisation. A product having improved extrusion properties can be obtained by incremental addition of disulphide and in particular by adding up to 30% of the xanthogen disulphide at the start and the remainder later. Most suitably where all the dialkyl xanthogen disulphide and all the chloroprene monomer are present at the start of the polymerisation the proportion by weight of dialkyl xanthogen disulphide to chloroprene monomer is in the range 0.05 to 0.7%.

Known aqueous emulsion systems can be used. Preferably the aqueous emulsion is prepared using a salt of a rosin acid as the emulsifying agent which is preferably present in a proportion of 2 to 6% by weight in relation to the weight of chloroprene monomer. The emulsions may be acidic, e.g. where emulsifiers active at low pH are used, but are preferably slightly alkaline although strongly alkaline conditions can be used. The preferred pH range is 10.5 to 12 where emulsifiers such as the water soluble alkali metal salts of rosin acids are used.

The conventional catalysts for chloroprene polymerisation may be used e.g. alkali metal or ammonium persulphates and ferricyanides. Organic hydroperoxides may be used alone or admixed with the inorganic persulphates. Catalyst activators and modifiers which give a more uniform rate of polymerization may also be present. Examples of these activators and modifiers are the alkyl mercaptans, sodium dithionite or sodium 2-anthraquinone sulphonate. The alkyl mercaptans may be present in the proportion of 0.05 to 0.5% by weight in relation to the weight of chloroprene monomer initially present. Preferably the total percentage of xanthogen disulphide and any alkyl mercaptan present when all the modifier is added at the start should not exceed 0.7%. The catalyst and catalyst activators are preferably added to the polymerisation either continuously or in a stepwise manner at such a rate so as to give a uniform rate of polymerisation.

All the chloroprene monomer can be present at the start of the polymerisation or part can be present at the start and the remainder added later.

The polymerisation is preferably carried out at between 0° to 80° C., the preferred range is from 40° to 60° C. Below 0° C. the polymerisation is generally too slow for convenience while above 80° C. the reaction may be difficult to control.

The percentage of monomer converted to polymer is usually between 50 and 100, preferably between 70 and 90.

Polymerisation may be short stopped at any desired point by the addition of "short stopping" agents, e.g. p-tert-butyl catechol and phenothiazine in quantities of about 0.01% of each compound in relation to the weight of chloroprene monomer. Small amounts of dialkyl dithiocarbamates such as for example dimethyl ammonium dimethyl dithiocarbamate are equally effective.

The Mooney viscosity of the rubber produced by this process can be lowered by treating the latex at the end of polymerisation with a dialkyl dithiocarbamate. The change in Mooney viscosity of the latex is rapid and independent of temperature, in the range 10–40° C. It is dependent on such factors as the alkalinity of the latex, the amount of xanthogen disulphide present and the amount of dialkyl dithiocarbamate added. An excess of dithiocarbamate over that required to react with the residual xanthogen disulphide does not produce a greater fall in the Mooney viscosity.

The preferred proportion of dialkyl dithiocarbamate in relation to the weight of chloroprene monomer charged to the polymerisation is in the range 0.05 to 5.0%. A rubber free from residual xanthogen disulphide can be obtained by addition of a dialkyl ammonium dialkyl dithiocarbamate in this manner.

A similar lowering of Mooney viscosity can be obtained when an aqueous solution of a reducing agent such as an ammonium or alkali metal sulphite or bisulphite, is added to the latex after the polymerisation has been short stopped, and in addition the product is lighter in color. Other suitable reducing agents are disclosed in copending British Patent 1,019,917 and British Patent 988,032.

The polymer can be isolated in any known way, for example by steam stripping the latex under reduced pressure to remove residual monomer, then isolating it by freeze coagulation and drying in an air-lay drier.

The sulphur modified polychloroprene rubber obtained by the process according to the present invention has a plasticity which allows the rubber to be processed in standard rubber equipment without the need for a separate peptisation stage at the end of the polymerisation and before isolation of the solid rubber. Such separate peptisation is required for the preparation of the known sulphur modified polychloroprene rubbers, such as those disclosed in British Patent 959,122. The rubber contains polysulphide linkages which may be broken during mastication and compounding. The extent of this breakdown may be increased and controlled by the addition of a suitable peptising agent, such as tetra ethyl thiuram disulphide to the solid rubber during mastication. The rubbers show surprisingly good storage properties and these are superior to those of known sulphur modified polychloroprene rubbers. The property of tack and breakdown behavior on mastication in the presence of suitable peptising agents is similar to that of these known rubbers.

The storage properties of the rubber may be further improved by the addition of an antioxidant. This is preferably added to the latex in the form of an emulsion or dispersion. The non-staining phenolic antioxidants such as 2,6-ditertiary-butyl-p-cresol are particularly suitable for protecting polychloroprene.

The process for preparing sulphur modified polychloroprene according to the present invention and the improved property of the polychloroprene so formed are illustrated by the following examples.

Example 1

A sulphur modified polychloroprene latex was prepared using an aqueous emulsion system as follows:

| Monomer phase: | Parts by weight |
|---|---|
| Chloroprene | 100 |
| Rosin acid (disproportionated) | 4.0 |
| Sulphur | 0.6 |
| Di-isopropyl xantogen disulphide | 0.5 |

| Aqueous phase: | |
|---|---|
| De-aerated water | 150 |
| Sodium hydroxide | 0.475 |
| Daxad 15 (a regd. trademark) for polymerised organic salts of sulphonic acids | 0.718 |
| Tri-sodium orthophosphate (anhydrous) | 0.30 |

| Catalyst solution: | |
|---|---|
| Potassium persulphate | [1] 0.125 |
| De-aerated water | [1] 8.35 |

[1] Total added.

The polymerisation was carried out at 50° C. at a pH of 11.3 and the catalyst solution added continuously to give a uniform rate of polymerisation.

The polymerisation was "short stopped" when about 85% of monomer had been polymerised by adding 0.3 part by weight of dimethyl ammonium dimethyl dithiocarbamate as a 10% aqueous solution. A small sample of latex was short stopped by treatment with 0.01 part by weight of p-tertiary butyl catechol (TBC) and 0.01 part by weight of phenothiazine in place of the dithiocarbamate.

The residual monomer was removed from the latex by steam stripping under reduced pressure, the rubber isolated by freeze coagulation; and then dried in an air-lay drier.

The TBC/phenothiazine treated latex yielded a rubber with a Mooney viscosity, ML 1+4' (100° C.) of 55. Samples of the dry rubber isolated from the dithiocarbamate treated latex had a Mooney viscosity ML 1+4' (100° C.) of 35 and were placed in an incubator at 70° C. and the changes in Wallace Plasticity with time recorded. The results are given in Table 1.

Example 2

A sulphur modified polychloroprene latex was prepared using the aqueous emulsion system shown in Example 1 but differing from it in the following respects.

| | Parts by weight |
|---|---|
| Sulphur | 0.5 |
| n-Dodecyl mercaptan | 0.2 |
| Di-isopropyl xanthogen disulphide | 0.2 |

The polymerisation was carried out at 40° C. at a pH of 11.3 and the catalyst system added continuously to give a uniform rate of polymerisation.

The polymerisation was "short stopped" when about 85% of the monomer had been polymerised by adding 0.01 part by weight of p-tertiary butyl catechol and 0.01 part by weight of phenothiazine in the form of an emulsion.

The dry rubber which had a Mooney viscosity ML 1+4' (100° C.) of 61 was isolated and aged in the manner described in Example 1 and the changes in Wallace Plasticity with time recorded. The results are given in Table 1.

TABLE 1

| Polymer | Mooney Viscosity ML 1+4' (100° C.) | Wallace Plasticity at 100° C. after ageing at 70° C. for— | | | | |
|---|---|---|---|---|---|---|
| | | Original | 1 day | 3 days | 5 days | 7 days |
| Example 1 | 35 | 19 | 19 | 18 | 19 | 25 |
| Example 2 | 61 | 26 | 27 | 26 | 22 | 25 |
| Neoprene GN | 51 | 26 | 17 | 14 | 18 | 26 |
| Neoprene W | 49 | 26 | 24 | 25 | 26 | 26 |

By way of comparison Table 1 shows the Mooney viscosity and changes in Wallace Plasticity with time of samples of Neoprene GN—a commercially available sulphur modified rubber and Neoprene W—a commercially available non-sulphur-modified rubber.

Example 3

A sulphur modified polychloroprene latex was prepared using an aqueous emulsion of the following composition:

Monomer phase: Parts by weight
- Chloroprene _____ 100
- Disproportionated rosin acid _____ 4.0
- Sulphur _____ 0.15
- Di-isopropyl xanthogen disulphide _____ 0.5

Aqueous phase:
- De-aerated water _____ 150
- Sodium hydroxide _____ 0.475
- Daxad 15 (a regd. trademark) _____ 0.718
- Tri-sodium orthophosphate (anhydrous) __ 0.30

Catalyst solution:
- Potassium persulphate _____ ¹ 0.125
- De-aerated water _____ ¹ 8.35

¹ Total added.

The polymerisation was carried out at 50° C. and the catalyst solution was added continuously to give a uniform rate of polymerisation. The pH of the latex throughout polymerisation was 11.6.

The polymerisation was "short-stopped" when about 84% of the monomer had been polymerised by adding 0.01 part by weight of p-tertiary butyl catechol and 0.01 part by weight of phenothiazine.

The residual monomer was removed from the latex by steam stripping under reduced pressure, the rubber isolated by freeze coagulation and dried in an air-lay drier.

The polychloroprene prepared as above was light colored and odorless and had the following properties prior to and after compounding.

*Uncompounded polymer.*—Plasticity changes on storage at 70° C. (recorded in Table 2) were compared with those of a commercially available sulphur modified rubber—Neoprene GN and a commercially available non-sulphur modified rubber—Neoprene W.

TABLE 2

| Polymer Uncompounded | Polymer aged at 70° C. | | | | | | |
|---|---|---|---|---|---|---|---|
| | Mooney viscosity ML 1+4' (100° C.) | | | Wallace plasticity (100° C.) | | | |
| | Original | 3 days | 10 days | Original | 3 days | 5 days | 10 days | 14 days |
| Sample 1 | 78 | 78 | 80 | 36 | 34 | 36 | 39 | 40 |
| Neoprene GN | 47 | 36 | 80 | 29 | 15 | 26 | 100 | |
| Neoprene W | 47 | 54 | 58 | 27 | 30 | 28 | 28 | 29 |

*Compounded polymer.*—Samples of the raw rubber aged in an incubator at 40° C. for up to 4 months were compounded using the following formula:

- Rubber _____ 100
- Phenyl β-naphthylamine _____ 2.0
- Stearic acid _____ 0.5
- Light calcined magnesium oxide _____ 4.0
- Zinc oxide _____ 5.0
- Philblack G (a regd. trademark for general purpose furnace black) _____ 29
- Tetraethyl thiuram disulphide _____ 1.0

By way of comparison Neoprene GN and Neoprene GRT rubbers similarly incubator aged at 40° C. were also compounded using the same formula with the exception that 1.0 part of tetraethyl thiuram disulphide was not added since this was already present in the rubber.

200 g. batches of rubber were compounded at a time in a laboratory mixer with water at 50° C. passing through the rotor and mixer jacket.

The changes in Mooney scorch time with raw rubber ageing time were compared with those of normal sulphur modified polychloroprenes available commercially, namely Neoprene GN and Neoprene GRT.

The Mooney scorch time measured was the time taken for a 10 point increase in Mooney viscosity above the minimum value determined at 120° C. using a large rotor. The results are given in Table 3.

TABLE 3

| Polymer | Mooney Scorch Time (120° C.) minutes | | | |
|---|---|---|---|---|
| | Raw rubber aged at 40° C. for— | | | |
| | Original | 1 month | 2 month | 4 months |
| Rubber from Example 3 | 35 | 35 | 35 | >40 |
| Neoprene GN | 13 | 7 | 7 | (*) |
| Neoprene GRT | 12 | 9 | 9 | 6 |

*Scorched in mixer.

The tear strength property of the vulcanised compounded rubber was compared with that of a commercially available sulphur modified rubber, Neoprene GRT and a commercially available non-sulphur modified rubber, Neoprene WRT.

The sulphur containing rubbers were compounded in the manner previously described, no tetraethyl thiuram being used with Neoprene GRT.

The Neoprene WRT was compounded in a similar manner using the following formulation:

Parts by weight
- Rubber _____ 100
- Phenyl β-naphthylamine _____ 2.0
- Stearic acid _____ 0.5
- Light calcined magnesium oxide _____ 4.0
- Zinc oxide _____ 5.0
- Philblack G (a regd. trademark) _____ 29.0
- Robac 22 _____ 0.5

The compounded rubbers were cured at 150° C. for 40 minutes and the tear strength determined using the method described in B.S. 2899 (1958) using transer type test pieces. The results are given in Table 4.

TABLE 4

Compounded rubber: Tear strength lbs./in.
- Rubber from Example 3 _____ 46
- Neoprene GRT _____ 39
- Neoprene WRT _____ 25

The rubber of the example exhibited the processing properties of tackiness, smooth extrusion and high tear strength which is typical of the ordinary commercially available sulphur modified polychloroprene rubbers and in addition showed extremely good stability on storage, which is normally associated with the non-sulphur modified polychloroprene rubbers.

Example 4

A sulphur modified polychloroprene latex was prepared using the aqueous emulsion system described in Example 3, but differing from it in that 0.15 part sulphur and 0.55 part di-isopropyl xanthogen disulphide were added at the start of polymerization and a further 0.35 part sulphur wetted with Daxad 15 solution were added at a 50-60 percent conversion level.

A polymerisation temperature of 50° C. was used, the pH of the latex was in the range 11.6–11.9 and the short stop added as described in Example 3 at the 84 percent conversion level.

The good storage properties of the raw rubber are shown in Table 5 in which the changes in Mooney viscosity and in Wallace Plasticity after accelerated aging at 70° C. are recorded.

TABLE 5

| Polymer aged at 70° C | | | | | | | |
|---|---|---|---|---|---|---|---|
| Mooney viscosity ML 1+4' (100° C.) | | | Wallace Plasticity (at 100° C.) | | | | |
| Original | 3 days | 10 days | Original | 3 days | 5 days | 10 days | 14 days |
| 61 | 59 | 59 | 25 | 25 | 24 | 25 | 25 |

The rubber was compounded in the formulation used for Neoprene WRT in Example 3.

| | Parts by weight |
|---|---|
| Rubber | 100 |
| Phenyl β-naphthylamine | 2.0 |
| Stearic acid | 0.5 |
| Light calcined magnesium oxide | 4.0 |
| Zinc oxide | 5.0 |
| Philblack (a regd. trademark) | 29.0 |

The compounded rubber was extruded using a Brabender Plastograph equipped with a rubber extrusion head and a modified Garvey die which is widely used in the rubber industry. The average die temperature was maintained at 75–78° C., and the extrudate had a smooth feather edge and a smooth surface finish.

Example 5

A sulphur modified polychloroprene latex was prepared using an aqueous emulsion system described in Example 3 but differing in that 0.15 part of sulphur and 0.2 part di-isopropyl xanthogen disulphide were added at the start of polymerisation. The xanthogen disulphide added represented 25 percent of the total xanthogen disulphide added to the polymerisation charge. The remaining 75 percent was dissolved in the minimum volume of chloroprene monomer and added in four equal amounts between the start of polymerisation and the point at which a 60% conversion level had been reached.

A polymerisation temperature of 50° C. and pH of 11.8 were used and the short stop added, as described in Example 3, at the 84 percent conversion level.

The rubber, having a Mooney viscosity ML 1+4' (100° C.) of 80 when first isolated, was compounded as described in Example 3 and extruded under the conditions given in Example 4. The product had a smooth feather edge and surface finish.

By way of comparison a sulphur modified polychloroprene latex was prepared using the aqueous emulsion system described in Example 3 but differing in that 0.15 part of sulphur and 0.4 part di-isopropyl xanthogen disulphide were added at the start of polymerisation. The xanthogen disulphide added represented 25 percent of the total xanthogen disulphide added to the polymerisation charge. The remaining 75 percent was dissolved in a minimum volume of chloroprene monomer and added in four equal amounts between the start of polymerisation and the point at which at 60 percent conversion level had been reached.

A polymerisation temperature of 50° C. was used and the pH of the latex was in the range 11.8–12.2.

Short-stop was added as described in Example 3 at the 84 percent conversion level. The rubber isolated as described in Example 3 had a Mooney viscosity ML 1+4' (100° C.) of 17.

Example 6

A sulphur modified polychloroprene latex was prepared using the aqueous emulsion system given in Example 3, but differing in that some of the sulphur and di-isopropyl xanthogen disulphide were added during the polymerisation. A total of 0.15 percent sulphur and 1.0 percent di-isopropyl xanthogen disulphide was used.

25 percent of each component was added at the start of polymerisation and the remainder in four equal amounts, the last portion being charged before the 60% conversion level had been reached.

The di-isopropyl xanthogen disulphide was dissolved in the minimum amount of chloroprene monomer and the sulphur was wetted with aqueous Daxad 15 solution before being charged to the reactor.

A polymerisation temperature of 50° C. was used, the pH of the latex was in the range 12.0–12.2 and the paratertiary butyl catechol/phenothiazine short stop, as used in Example 3, was added at an 84 percent conversion level.

The rubber, having a Mooney viscosity ML 1+4' (100° C.) of 44 when first isolated, had when compounded and extruded using the conditions described in Examples 3 and 4, a smooth feather edge and surface finish.

Example 7

A sulphur modified polychloroprene latex was prepared using the aqueous emulsion system and conditions described in Example 3.

A sample or rubber isolated from the latex held at 40° C. for 1 hour after short stop had a Mooney viscosity ML 1+4' (100° C.) of 70.

Another sample of this latex, after short stop, was treated with 0.5 part of sodium sulphite (based on the weight of chloroprene monomer) as a dilute aqueous solution. The treated latex was held at 40° C. for 1 hour. The rubber isolated as described in Example 3 had a Mooney viscosity ML 1+4' (100° C.) of 56. This illustrates that treatment of the latex by sodium sulphite lowers the Mooney viscosity of the rubber.

A further sample of this latex was treated after short stop with 0.25 part of sodium sulphite and 0.2 part of dimethyl ammonium dimethyl dithiocarbamate (based on the weight of chloroprene monomer) both reagents being added as a dilute aqueous solution. The treated latex was held at 40° C. for 1 hour. The rubber isolated from this latex had a Mooney viscosity ML 1+4' (100° C.) of 57. This illustrates that treatment of the latex with a mixture of sodium sulphite and dimethyl ammonium dimethyl dithiocarbamate lowers the Mooney viscosity of the rubber.

I claim:

1. A process for preparing sulphur modified polychloroprene which comprises polymerizing chloroprene monomer, 2-chloro-1,3-butadiene, alone or with a minor proportion of a copolymerizable monomer containing at least one polymerizable $CH_2=C<$ group in an aqueous emulsion system in the presence of sulphur in a percentage by weight in relation to the total weight of chloroprene monomer charged to the polymerization in the range 0.01 to 2% and a dialkyl xanthogen disulphide of the formula:

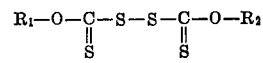

wherein $R_1$ and $R_2$ are alkyl of 1 to 8 carbon atoms and the percentage by weight of dialkyl xanthogen disulphide in relaion to the total weight of chloroprene monomer charged to the polymerization is in the range 0.01 to 1.5% and is insufficient to prevent the formation of a polymer having a Mooney Viscosity ML1+4' (100° C.) of at least 25 as determined by the method described in British standard specification No. 1,673, part 3, 1951 when the rubber is passed ten times through a mill with the rolls at a temperature of 20±5° C. and with a nip gap of eighty thousandths of an inch.

2. A process as claimed in claim 1 wherein the aqueous emulsion system is alkaline.

3. A process as claimed in claim 1 wherein all the dialkyl xanthogen disulphide and all the chloroprene monomer are present at the start of the polymerization and the proportion by weight of dialkyl xanthogen disulphide to chloroprene monomer is in the range 0.05 to 0.7%.

4. A process as claimed in claim 1 wherein dialkyl xanthogen disulphide is added incrementally during polymerization.

5. A process as claimed in claim 1 wherein up to 30% by weight of the dialkyl xanthogen disulphide is added at the start of the polymerization and the remainder during polymerization.

6. A process as claimed in claim 1 wherein the dialkyl xanthogen disulphide is di-isopropyl xanthogen disulphide.

7. A process as claimed in claim 1 wherein the polymerization of chloroprene monomer is short stopped by addition of a dialkyl dithiocarbamate or a p-tertiary butyl catechol/phenothiazine mixture.

8. A process as claimed in claim 7 wherein the proportion of dialkyl dithiocarbamate added in relation to the weight of chloroprene monomer charged to the polymerization is in the range of 0.05 to 5%.

9. A process as claimed in claim 1 wherein an ammonium or alkali metal sulphite or bisulphite is added to the latex after polymerization has been short stopped.

10. A process for preparing sulphur modified polychloroprene which comprises polymerizing chloroprene monomer, 2-chloro-1,3-butadiene, alone or with a minor proportion of a copolymerizable monomer containing at least one polymerizable $CH_2=C<$ group in an aqueous alkaline emulsion system in the presense of sulphur in a proportion in relation to the total weight of chloroprene monomer charged to the polymerization in the range 0.15 to 0.6% and a dialkyl xanthogen disulphide of the formula:

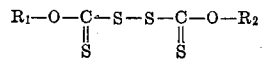

wherein $R_1$ and $R_2$ are alkyl of 1 to 8 carbon atoms and the percentage by weight of dialkyl xanthogen disulphide in relation to the total weight of chloroprene monomer charged to the polymerization is in the range 0.01 to 1.5% and is insufficient to prevent the formation of a polymer having a Mooney Viscosity ML1+4' (100° C.) of at least 25 as determined by the method described in British standard specification No. 1,673, part 3, 1951 when the rubber is passed ten times through a mill with the rolls at a temperature of 20±5° C. and with a nip gap of eighty thousandths of an inch.

References Cited
UNITED STATES PATENTS

| | | | |
|---|---|---|---|
| 2,576,009 | 11/1951 | Goertz | 260—92.3 |
| 2,707,180 | 4/1955 | Maynard | 260—92.3 |
| 2,914,497 | 11/1959 | Keller | 260—92.3 |
| 2,962,475 | 11/1960 | Malz et al. | 260—92.3 |
| 3,047,544 | 7/1962 | Byrd | 260—79 |
| 3,060,160 | 10/1962 | Boussu | 260—92.3 |
| 3,105,055 | 9/1963 | Aho | 260—92.3 |
| 3,147,317 | 9/1964 | Jungk et al. | 260—92.3 |
| 3,190,865 | 6/1965 | Miller et al. | 260—92.3 |
| 3,231,556 | 1/1966 | Hutchinson | 260—92.3 |
| 3,300,433 | 1/1967 | Apotheker | 260—92.3 |

DONALD E. CZAJA, *Primary Examiner.*

M. I. MARQUIS, *Assistant Examiner.*